United States Patent [19]

Hsu et al.

[11] Patent Number: 5,151,398
[45] Date of Patent: Sep. 29, 1992

[54] CATALYST FOR THE SYNTHESIS OF CRYSTALLINE 3,4-POLYISOPRENE

[75] Inventors: Wen-Liang Hsu, Copley; Adel F. Halasa, Bath, both of Ohio

[73] Assignee: The Goodyear Tire & Rubber Company, Akron, Ohio

[21] Appl. No.: 716,475

[22] Filed: Jun. 17, 1991

Related U.S. Application Data

[62] Division of Ser. No. 602,546, Oct. 24, 1990, Pat. No. 5,082,906.

[51] Int. Cl.$^5$ ................................. C08F 4/70
[52] U.S. Cl. ................ 502/117; 502/111; 526/141
[58] Field of Search ................... 502/117, 111

[56] References Cited

U.S. PATENT DOCUMENTS 3,725,373  4/1973  Yoo .................. 502/117 X

Primary Examiner—Patrick P. Garvin
Attorney, Agent, or Firm—Alvin T. Rockhill

[57] ABSTRACT

Crystallizable 3,4-polyisoprene can be synthesized in organic solvents to quantitative yields after short polymerization times by utilizing the catalyst systems of this invention. The 3,4-polyisoprene made utilizing this catalyst system is strain crystallizable and can be employed in tire treads which provide improved traction and improved cut growth resistance. This invention specifically discloses a process for the synthesis of 3,4-polyisoprene which comprises polymerizing isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

10 Claims, No Drawings

CATALYST FOR THE SYNTHESIS OF CRYSTALLINE 3,4-POLYISOPRENE

This is a divisional of application Ser. No. 07/602,546, filed on Oct. 24, 1990, now issued as U.S. Pat. No. 5,082,906.

BACKGROUND OF THE INVENTION

Strain crystallizable elastomers are very desirable as tire polymers for improved tire properties, such as improved tire traction characteristics, improved flex characteristics and improved tear resistance. Unfortunately, polyisoprene which is prepared utilizing conventional procedures is not strain crystallizable due to its amorphous structure. Such 3,4-polyisoprenes can be easily prepared using an organolithium catalyst in conjunction with a polar modifier. For instance, Natta, Porri, and Carbonaro, 77 Makromolecular Chemistry 126 (1964) discloses a catalyst for preparing atactic 3,4-polyisoprene.

A technique for preparing crystallizable 3,4-polyisoprene is disclosed by Sun and Wang, 2 Acta Polymerica Sinica 145 (1988). These Chinese researchers disclose that crystalline 3,4-polyisoprene containing about 70% 3,4-microstructure and about 30% cis-1,4-microstructure can be prepared using a catalyst system containing iron acetyl acetonate, a trialkyl aluminum compound, and an amine modifier in benzene. However, the utilization of this catalyst system developed by the Chinese results in the formation of gel and poor yields.

SUMMARY OF THE INVENTION

It has been unexpectedly found that the inclusion of a small amount of a protonic compound in a catalyst system containing an organoaluminum compound, an organoiron compound and a chelating aromatic amine greatly improves yield and reduces gelation occurring during polymerization. The inclusion of the protonic compound also allows for the polymerization to be conducted in aliphatic organic solvents to high conversions at fast rates. The 3,4-polyisoprene which is synthesized using the catalyst system of this invention has a 3,4-microstructure content which is typically within the range of about 70% to about 85%. The utilization of such catalyst systems typically results in yields of greater than about 90% with yields in excess of 95% being preferred.

The 3,4-polyisoprene made by utilizing the catalyst system and techniques of this invention is strain crystallizable. This 3,4-polyisoprene is stereospecific and is believed to be syndiotactic or isotactic. In any case, it offers important benefits when employed in tire tread rubber compositions. For instance, improved traction characteristics and improved cut growth resistance can be obtained. The crystallizable 3,4-polyisoprene made utilizing the techniques of this invention resembles natural rubber in some respects, but it has a higher glass transition temperature and accordingly offers better traction characteristics in tire tread compositions.

The present invention specifically discloses a catalyst system which can be utilized in the polymerization of isoprene monomer into 3,4-polyisoprene, said catalyst system being comprised of (a) an organoiron compound, (b) an organoaluminum compound, (c) a chelating aromatic amine, and (d) a protonic compound: wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

The subject invention also reveals a process for the synthesis of 3,4-polyisoprene which comprises polymerizing isoprene monomer in an organic solvent at a temperature which is within the range of about $-10°$ C. to about $100°$ C. in the presence of a catalyst system which is comprised of (a) an organoiron compound, (b) an organoaluminum compound, (c) a chelating aromatic amine, and (d) a protonic compound: wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

The present invention further discloses a process for the synthesis of 3,4-polyisoprene which comprises: (1) adding a catalyst system which is comprised of (a) an organoiron compound, (b) an organoaluminum compound, (c) a chelating aromatic amine, and (d) a protonic compound: wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1 to a polymerization medium containing isoprene monomer and an organic solvent, and (2) allowing the isoprene monomer to polymerize at a temperature which is within the range of about $-10°$ C. to about $100°$ C.

DETAILED DESCRIPTION OF THE INVENTION

The catalyst systems of this invention are comprised of (a) an organoiron compound, (b) an organoaluminum compound, (c) a chelating aromatic amine, and (d) a protonic compound. The organoiron compound will be soluble in the organic solvent used in the polymerization medium with the iron being in the +3 oxidation state. Some representative examples of suitable organoiron compounds include ferric benzoate, ferric acetate, ferric naphthenate, ferric octanoate, ferric neodecanoate, ferric palmitate, ferric stearate, ferric acetylacetonate, ferric salicaldehyde, ferric diglyoxime, ferric tetracarbonyl, ferric 2-ethylhexanoate, ferrocene and alkylferrocenes.

The organoaluminum compounds that can be utilized will typically be of the structural formula:

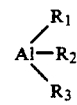

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Trialkylaluminum compounds are generally preferred. The preferred trialkylaluminum compounds include triethyl aluminum (TEAL), tri-n-propyl aluminum, triisobutyl aluminum (TIBA), trihexyl aluminum, diisobutyl aluminum hydride (DIBA-H), and diethyl aluminum fluoride.

A wide variety of chelating aromatic amines can be utilized in the catalyst systems of this invention. The chelating aromatic amine will typically be a chelating aromatic diamine. Some representative examples of suitable chelating aromatic amines include 1,10-phenanthroline, 2,2'-bipyridine, 2,2',2''-terpyridine, cyanopyridines, amino anilines, amino pyridines, nitroanilines, nitropyridines and 1,4-phenylenediamine.

The protonic compound will typically be water, an alcohol or a carboxylic acid. In most cases, it is preferred to utilize water as the protonic compound. However, methanol, ethanol, isopropyl alcohol, n-propyl alcohol, t-butanol, isobutyl alcohol, or n-butyl alcohol can also be employed. Higher alcohols can also be utilized as the protonic compound. A wide variety of carboxyl group containing compounds can also be utilized as the protonic compound. For instance, stearic acid can be used.

The ratio of the chelating aromatic amine to the organoiron compound in the catalyst system will typically be within the range of about 0.1:1 to about 1:1. The molar ratio of the chelating aromatic amine to the organoiron compound will preferably be within the range of about 0.2:1 to about 0.5:1. The molar ratio of the organoaluminum compound to the organoiron compound will typically be within the range of about 5:1 to about 200:1. It is normally preferred for the molar ratio of the organoaluminum compound to the organoiron compound to be within the range of about 20:1 to about 100:1. It is most preferred for the molar ratio of the organoaluminum compound to the organoiron compound to be within the range of about 40:1 to about 60:1. The molar ratio of the protonic compound to the organoaluminum compound will typically be within the range of about 0.001:1 to about 0.2:1. It is generally preferred for the ratio of the protonic compound to the organoaluminum compound to be within the range of 0.005:1 to about 0.1:1. It is most preferred for the molar ratio of the protonic compound to the organoaluminum compound to be within the range of about 0.01:1 to about 0.07:1.

The polymerizations of this invention will typically be carried out as solution polymerizations which are conducted in an organic solvent. The organic solvent can be an aromatic hydrocarbon or a saturated aliphatic hydrocarbon. Some representative examples of suitable aromatic solvents include benzene, toluene, xylenes, ethylbenzene, diethylbenzene, isobutylbenzene, and the like. For environmental reasons aliphatic solvents are highly preferred. Some representative examples of suitable aliphatic solvents include n-hexane, cyclohexane, methylcyclohexane, isohexanes, n-heptane, n-octane, isooctanes, n-decane, 2,2-dimethylbutane, petroleum ether, kerosene, petroleum spirits, petroleum naphtha and the like. It is important for the organic solvent to be a liquid under the conditions (temperature and pressure) utilized for the polymerization.

Such solution polymerizations are carried out in a polymerization medium which is comprised of the organic solvent and isoprene monomer. Such polymerization mediums will typically contain from about 5 weight percent to about 35 weight percent isoprene, based upon the total weight of the polymerization medium. It is typically preferred for the polymerization medium to contain from about 10% to about 30% isoprene. It is generally more preferred for the polymerization medium to contain from about 15 weight percent to about 25 weight percent isoprene. As the polymerization proceeds, monomer will be converted to polymer. Accordingly, the polymerization medium will typically contain from about 5 weight percent to about 35 weight percent monomers and polymer, based upon the total weight of the polymerization medium.

The polymerizations of this invention can be carried out as a batch process, on a semi-continuous basis, or on a continuous basis. In any case, the polymerization is initiated by adding the catalyst system to the isoprene containing polymerization medium. The four component catalyst system can be added to the polymerization medium as a premix or it can be prepared in situ. It is typically preferred to prepare a premix of the protonic compound with the organoaluminum compound. It has been found that it is most desirable to add the isoprene monomer to the polymerization medium first and then to add the organoiron compound and the chelating aromatic amine with a preformed protonic compound/organoaluminum compound component being added last.

Such polymerizations are typically conducted at a temperature which is within the range of $-10°$ C. to about $100°$ C. It is generally preferred for the polymerization to be carried out at a temperature which is within the range of about $0°$ C. to about $50°$ C. It is most preferred for such polymerizations to be conducted at a temperature which is within the range of $10°$ C. to $30°$ C.

By utilizing the catalyst systems of this invention, very high conversions can be reached after relatively short polymerization times. For instance, conversions of greater than 95% can be attained in one to two hours. Additionally, virtually no gelation occurs when the catalyst systems of this invention are employed. The crystallizable 3,4-polyisoprene made by the process of this invention will have a dilute solution viscosity of less than about 5.0 dl/g and preferably less than 3.0 dl/g. It is important for the 3,4-polyisoprene to have a dilute solution viscosity of less than 5.0 dl/g to be processable.

After the polymerization has been completed, the crystallizable 3,4-polyisoprene produced can be recovered utilizing standard techniques. In most cases, it will be desirable to utilize a coagulation technique in recovering the crystallizable 3,4-polyisoprene. It will generally be desirable to remove residual organic solvent from the polymer by evaporation which can be facilitated by the application of vacuum and elevated temperatures.

This invention is illustrated by the following examples which are merely for the purpose of illustration and are not to be regarded as limiting the scope of the invention or the manner in which it can be practiced. Unless specifically indicated otherwise, parts and percentages are given by weight.

COMPARATIVE EXAMPLE 1

Sixty-five grams of column dried isoprene premix (15% in hexane) was charged to a 4 oz. (118 ml.) bottle. Ferric acetylacetonate (0.015 mmoles) and 1,10-phenanthroline was added at a molar ratio of 2:1 followed by the addition of TIBA (0.30 mmoles). The molar ratio of the TIBA to the ferric acetylacetonate used in this experiment was 20/1. The polymerization was carried out at 10° C. for 48 hours. A shortstop solution consisting of methanol, rosin acid, triisopropanolamine, and an antioxidant was then added to quench the polymerization and also to stabilize the polymer formed. After evaporating hexane, the polymer was dried in a vacuum oven at 50° C. overnight. 3.5 grams of highly gelled polyisoprene was obtained (35% yield: 31% gel). It had a Tg of +6° C. and the microstructure (by NMR) 74% 3,4-PI and 26% cis-1,4-PI. Its unstretched crystallinity at room temperature was 7% as determined using WAXS (wide angle x-ray scattering) method.

EXAMPLE 2

The procedure described in Example 1 was utilized in this example except that a partially hydrolyzed TIBA (the molar ratio of water to TIBA was 0.064) was used instead of TIBA and the polymerization time was 30 minutes. The hydrolyzed TIBA was prepared by directly adding the calculated amount of water to TIBA at room temperature. 9.3 grams of polymer was obtained (93% yield). The polymer contained percent gel and had a Tg at +6° C. and a melting point at 45° C. The dilute solution viscosity (DSV) of this polyisoprene in toluene was 4.71.

EXAMPLE 3

The procedure described in Example 2 was utilized in this example except that the molar ratio of TIBA to ferric acetylacetonate was increased to 50:1. The yield was 63% (6.3 grams) and it was determined to have a glass transition temperature at +5.4° C. and a melting point at 50° C. It had 22% crystallinity at room temperature without stretching. Upon stretching at room temperature, its crystallinity increased to 42. It was also determined to have a microstructure which contained 78% 3,4-polyisoprene units, and 22% cis-1,4-polyisoprene units. The dilute solution viscosity of this polymer in toluene was 4.08.

EXAMPLE 4

The procedure described in Example 2 was utilized in this example except that the molar ratio of TIBA to ferric acetylacetonate was increased to 150:1. The yield was 47% (4.7 grams) and it was determined to have a glass transition temperature at +4.2° C. and a melting point at 120° C. It had 34% crystallinity at room temperature without stretching. It was also determined to have a microstructure which contained 76% 3,4-polyisoprene units, and 26% cis-1,4-polyisoprene units. The dilute solution viscosity of this polymer in toluene was 2.53.

EXAMPLE 5

The procedure described in Example 2 was utilized in this example except that the polymerization was maintained at 25° C. for one hour. The yield was 100% (10 grams) and it was determined to have a glass transition temperature at +2.4° C. It was also determined to have a microstructure which contained 72% 3,4-polyisoprene units, and 28% cis-1,4-polyisoprene units. The dilute solution viscosity of this polyisoprene in toluene was 2.78.

EXAMPLE 6

The procedure described in Example 2 was utilized in this example except that 0.5 phm of 1,2-butadiene was added to the isoprene premix and polymerization was 16 hours. The yield 97% (9.7 grams) and it was determined to have a glass transition temperature at +7.8° C. It was also determined to have a microstructure which contained 80% 3,4-polyisoprene units, and 20% cis-1,4-polyisoprene units. The dilute solution viscosity in toluene was 2.03.

EXAMPLE 7

In this experiment, the polymerization was conducted in a one gallon (3.8 liter) reactor using a higher catalyst level at 30° C. Thus, 2000 grams of monomer solution which contained 14.73% isoprene in hexane was charged into a one gallon reactor (3.8 liters). Polymerization was initiated by charging 20.6 ml of a 0.05 M solution of ferric acetylacetonate and 1,10-phenanthroline and 71.1 ml of a 0.87 M solution of hydrolyzed TIBA (the molar ratio of water to TIBA was 0.075). Small samples were taken out of the reactor to monitor the level of residual monomers. Such samples showed that the polymerization was 79.3%, 87%, and 91% complete after 30, 60 and 120 minutes, respectively. The polymerization was shortstopped after 4 hours of polymerization time and polymer was recovered using a similar procedure as described in Example 1. 287 grams of dried polymer was obtained (97.2% yield). The polyisoprene produced was determined to have a glass transition temperature at +0.65° C. The dilute solution viscosity in toluene was 2.30.

EXAMPLE 8

The procedure described in Example 7 was utilized in this example except that the polymerization was conducted continuously in two one-gallon (3.8 liter) reactors. The monomer solution was pumped into the first reactor at a rate of 6.6 kg/hour at 35° C. The residence time for both reactors were set at 30 minutes. The average conversions were 85 and 90% for first and second reactors, respectively, The average dilute solution viscosities in toluene were 2.4 to 2.7. The polyisoprene produced was determined to have a Tg at +2° to +3° C.

While certain representative embodiments and details have been shown for the purpose of illustrating the subject invention, it will be apparent to those skilled in this art that various changes and modifications can be made therein without departing from the scope of the subject invention.

What is claimed is:

1. A catalyst system which can be utilized in the polymerization of isoprene monomer into 3,4-polyisoprene, said catalyst system being comprised of (a) an organoiron compound, which is soluble in the organic solvent, wherein the iron in the organiron compound is in the +3 oxidation state, (b) partially hydrolized organoaluminum compound, which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

2. A catalyst system as specified in claim 1 wherein the organoaluminum compound is a trialkyl aluminum compound.

3. A catalyst system as specified in claim 2 wherein the organoiron compound is selected from the group consisting of ferric benzoate, ferric acetate, ferric naphthenate, ferric octanoate, ferric neodecanoate, ferric palmitate, ferric stearate, ferric acetylacetonate, ferric salicaldehyde, ferric diglyoxime, and ferric tetracarbonyl.

4. A catalyst system as specified in claim 3 wherein the chelating aromatic amine is selected from the group consisting of 1,10-phenanthroline, 2,2-dipyridyl, and 1,4-phenylenediamine.

5. A catalyst system as specified in claim 4 wherein the protonic compound is selected from the group consisting of water, methanol, ethanol, isopropyl alcohol and normal propyl alcohol.

6. A catalyst system as specified in claim 5 wherein the molar ratio of the chelating aromatic amine to the organoiron compound is within the range of about 0.2:1 to about 0.5:1; wherein the molar ratio of the organoaluminum compound to the organoiron compound is within the range of about 20:1 to about 100:1: and wherein the molar ratio of the protonic compound to the organoaluminum compound is within the range of about 0.005:1 to about 0.1:1.

7. A catalyst system as specified in claim 6 wherein the trialkyl aluminum compound is selected from the group consisting of triethyl aluminum, tri-n-propyl aluminum, triisobutyl aluminum and trihexyl aluminum.

8. A catalyst system as specified in claim 7 wherein the molar ratio of the organoaluminum compound to the organoiron compound is within the range of about 40:1 to about 60:1; and wherein the molar ratio of the protonic compound to the organoaluminum compound is within the range of about 0.01:1 to about 0.07:1.

9. A catalyst system as specified in claim 1 wherein the molar ratio of the chelating diamine to the organoiron compound is within the range of about 0.2:1 to about 0.5:1: wherein the molar ratio of the organoaluminum compound to the organoiron compound is within the range of about 40:1 to about 60:1: and wherein the molar ratio of the protonic compound to the organoaluminum compound is within the range of about 0.01:1 to about 0.07:1.

10. A catalyst system as specified in claim 9 wherein the organoaluminum compound is triisobutyl aluminum, wherein the organoiron compound is ferric acetyl acetonate, wherein the chelating aromatic amine is 1,10-phenanthroline, and wherein the protonic compound is water.

* * * * *